(12) United States Patent
Dorbie (10) Patent No.: US 6,545,685 B1
(45) Date of Patent: Apr. 8, 2003

(54) METHOD AND SYSTEM FOR EFFICIENT EDGE BLENDING IN HIGH FIDELITY MULTICHANNEL COMPUTER GRAPHICS DISPLAYS

(75) Inventor: Angus Dorbie, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/231,405

(22) Filed: Jan. 14, 1999

(51) Int. Cl.[7] ................................................ G09G 5/00
(52) U.S. Cl. ...................... 345/582; 345/629; 345/597; 348/38; 348/383
(58) Field of Search ................................ 345/419, 426, 345/629, 597, 582; 348/38, 383, 382; 463/42

(56) References Cited

U.S. PATENT DOCUMENTS

| | | | | |
|---|---|---|---|---|
| 4,974,073 A | * | 11/1990 | Inova | 348/38 |
| 5,136,390 A | * | 8/1992 | Inova et al. | 348/383 |
| 5,896,136 A | * | 4/1999 | Augustine et al. | |
| 6,126,548 A | * | 10/2000 | Jacobs et al. | 463/42 |
| 6,184,903 B1 | * | 2/2001 | Omori | |

* cited by examiner

Primary Examiner—Mark Zimmerman
Assistant Examiner—Kimbinh T. Nguyen
(74) Attorney, Agent, or Firm—Sterne, Kessler, Goldstein & Fox P.L.L.C.

(57) ABSTRACT

A method for implementing edge blending between a first and second video frame to create a seamless multichannel display system. The method is implemented in a graphics computer system including a processor coupled to a memory via a bus. Within the computer system, a first video frame is rendered for display on a first video channel. A second video frame is rendered for display on a second channel. A first overlap region is rendered onto the first frame to obtain a first blended video frame. A second overlap region is blended onto the second frame to obtain a second blended video frame. The first blended video frame from the first channel and the second blended video frame from the second channel are then combined such that the first overlap region and the second overlap region correspond, thereby forming a seamless junction between the first blended frame and the second blended frame and implementing a high fidelity multichannel display.

32 Claims, 11 Drawing Sheets

ALPHA MASK — 1301

FIG. 14

PRE-BLEND   POST-BLEND

FIG. 15

METHOD AND SYSTEM FOR EFFICIENT EDGE BLENDING IN HIGH FIDELITY MULTICHANNEL COMPUTER GRAPHICS DISPLAYS

FIELD OF THE INVENTION

The field of the present invention pertains to computer implemented graphics. More particularly, the present invention relates to a system and method for implementing high fidelity multichannel computer graphics displays.

BACKGROUND OF THE INVENTION

Many computer implemented applications interact with and present information to a user via graphical means. Some of the most compelling such applications involve visual computing/data visualization, whereby information and interaction with the user is accomplished through the use of large graphical displays. For example, applications have been created which graphically depict information stored within a database (e.g., information describing an underground oil field) allow the user to interact with the information in real-time, visually, by "moving" through a "virtual" representation of the information stored within the database (e.g., popularly known as "virtual reality").

These applications typically require large, high fidelity displays for their most compelling implementation. For example, a powerful visual computing system might include a very large wrap-around screen for graphically presenting data/information to one or more users. The large wrap around screens allow the creation of an extremely realistic, compelling, virtual representation of the information to the one or more users, allowing them to realistically "navigate" through any virtual 3D environment, such as, for example, "walking" through the rooms of a newly designed building, "flying" over a large terrain data base of geo-specific data, or the like.

Accordingly, virtual reality, advanced CAD, and other similar advanced visual computing applications require large high fidelity graphics displays for effective implementation. As is well known in the art, the creation of large graphics-type visual displays in a manageable and cost efficient manner has proven problematic. One commonly used method of generating a large display is to combine multiple (e.g., two or more) smaller screens, or visual channels, into a single larger display. This type of display is referred to as a multichannel display, since the single larger image is created through the combination of two or more smaller images.

Figure 1:
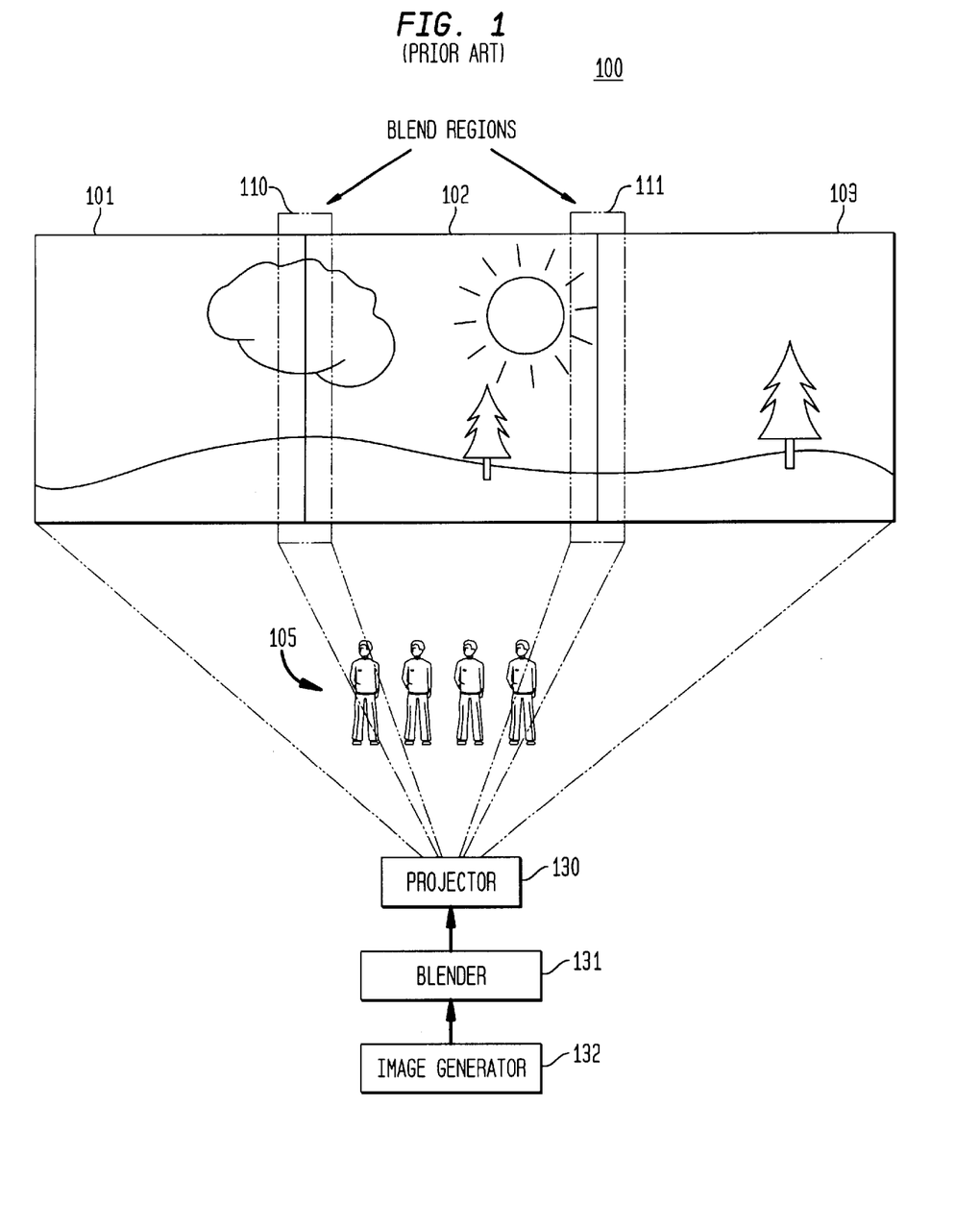
FIG. 1 shows a diagram of a prior art multichannel image generator and display system.

Prior art FIG. 1 shows a diagram of a typical large multichannel display system 100. System 100 includes three smaller screens (e.g., 20 feet by 30 feet), screen 101, screen 102, and screen 103, that are combined to form a single very large display (e.g., 20 feet by 90 feet). Areas 110 and 110 show the junctions between the screens. Screens 101–103 function coherently in order to create the large display (e.g., 20 feet by 90 feet) seen by a group of users 105. In this implementation, screens 101–103 are projection type screens, with the images projected from an image projector 130. Image projector 130 receives video information from an image generator 132 via a blender 131.

To ensure fidelity, the edges between the channels of screens 101–103, "blend regions" 110 and 111, need to blend seamlessly in order to create the large image. This has proven problematic. As with most arrayed multichannel displays, the edges of the combined channels must be blended such that the "seams" are as unnoticeable as possible. In projection type multichannel displays (e.g., system 100), one typical prior art approach is to overlap the edges of the image from each video feed in order to create a smooth transition from the image of one channel to the next, in order to smooth the seams of areas 110 and 111. This requires some overlap of the video from each image and requires that the brightness of one image reduces as the other increases in the overlap region, areas 110 and 111. To maintain high fidelity, the brightness levels of the channels need to be precisely controlled. However, achieving this level of control often requires the incorporation of expensive, dedicated hardware within image generator unit 130.

Figure 2:
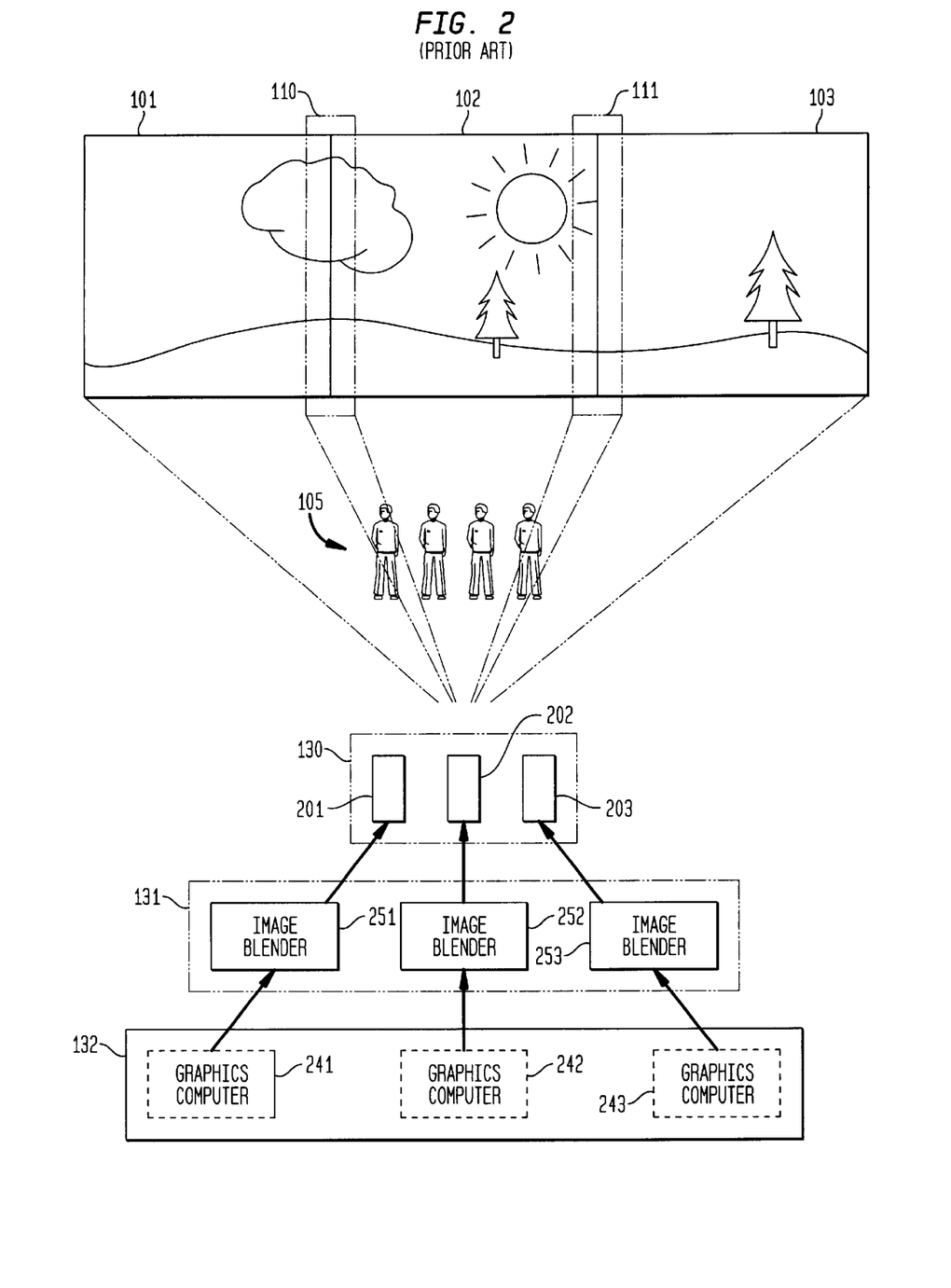
FIG. 2 shows a diagram of the multichannel image generator and display system of FIG. 1 in greater detail.

Prior art FIG. 2 shows system 100 in greater detail. As depicted in FIG. 2, the image generator 132 includes graphics computers 241–243 for generating the video information for each video channel. Computers 241–243 are respectively coupled to image blenders 251–253, which are in turn coupled to projectors 201–203. Projectors 201–203 function by projecting the video information received from computers 241–243 and image blenders 251–253 onto their respective one of screens 101–103.

As described above, to maintain high fidelity, the seams of blend regions 110 and 111 need to be precisely blended such that they are as unnoticeable as possible. System 100 includes dedicated image blenders 251–253 for performing the precise brightness control required to implement the seamless overlap of screens 101–103. Computers 241–243 include graphics processing hardware and software and function by generating the video information for each respective channel for screens 101–103. Blenders 251–253 perform brightness processing on the video information received from computers 241–243.

With system 100, and other similar prior art multichannel display systems, the blending function is performed by the dedicated image blenders 251–253. Image blenders 251–253 are dedicated, special purpose hardware components which process the video information emerging from computers 241–243. The image blenders 251–253, as is typical with prior art multichannel display systems, are format/hardware implementation specific, in that they are not readily interchangeable among display systems from different manufacturers. Because of the required level of fidelity, image blenders 251–253 are relatively complex and expensive, adding significantly to the overall complexity and cost of system 100.

Thus, what is required is a method and system for implementing high fidelity blending for multichannel displays without requiring the use of a dedicated blending hardware for post-image generation blending processing. What is required is a system which can be efficiently implemented on multiple computer system platforms. The required system should be inexpensive, and not require additional, dedicated hardware for its implementation.

SUMMARY OF THE INVENTION

The present invention is a method and system for implementing high fidelity blending for multichannel displays without requiring the use of a dedicated blending hardware for processing video information after it emerges from an image generator. The present invention provides a system which can be efficiently implemented on multiple computer system platforms. The system of the present invention is inexpensive, and does not require additional, dedicated hardware for its implementation.

In one embodiment, the present invention is implemented as an edge blending process executed on a graphics computer system included within the image generator. The computer system included within the image generator performs the edge blending processing on the gamma-corrected image before it is taken from the frame buffer or sent to video. This eliminates the need for a separate dedicated blending hardware unit, as required with prior art multi-channel display systems. The computer systems included within the image generator perform the edge blending processing on each of the video frames of the channels such that as the video information emerges from the image generator each of the video frames includes the necessary blending required for creating a seamless multichannel display.

The blending process of the present invention occurs as the information is being rendered by the computer systems. For example, As a left computer generated frame is rendered for display on a first video channel, a calculated blend geometry is rendered onto that frame to modulate the brightness in the blend/overlap region, resulting in a first blended frame. This occurs before the frame is sent to video. As a right frame is rendered for display on a second channel, a second complimentary blend geometry is rendered onto the second frame to modulate the brightness of the second frame in the blend/overlap region, resulting in a second blended frame. The overly regions of these blended frames have their respective brightness levels modulated such that when the first and second blended frames are sent to video and projected onto adjacent first and second screens, the resulting images overlap within the overlap regions and combine such that the first and second overlap regions precisely align. In this manner, the image from the first blended video frame and the image from the second blended video frame form a seamless junction between the two, thereby implementing a high fidelity multichannel display.

BRIEF DESCRIPTION OF THE DRAWINGS

The present invention is illustrated by way of example and not by way of limitation, in the Figures of the accompanying drawings and in which like reference numerals refer to similar elements and in which:

Prior art

Prior art

FIG. 3 shows a diagram of a multichannel image generator and display system in accordance with one embodiment of the present invention to.

DETAILED DESCRIPTION OF THE INVENTION

In the following detailed description of the present invention, a method and system for efficient edge blending in high fidelity multichannel computer graphics displays, numerous specific details are set forth in order to provide a thorough understanding of the present invention. However, it will be obvious to one skilled in the art that the present invention may be practiced without these specific details and on systems which do not fully implement the depicted architectural details. In other instances well known methods, procedures, components, and circuits have not been described in detail as not to unnecessarily obscure aspects of the present invention. It should also be recognized by one skilled in the art that some aspects of the present invention pertain to graphics subsystems, and as such, can apply not only to graphics computers, but to any computer based image generator, such as, for example, a simple computer image generator having simple controlling hardware and which connects directly to data base memory or a mass storage device.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "sending" or "processing" or "executing" or "storing" or the like, refer to the action and processes of a computer system, or similar data processing device, that manipulates and transforms data represented as physical (electronic) quantities within the computer system's registers and memories into other data similarly represented as physical quantities within the computer system memories or registers or other such information storage, transmission or display devices.

The present invention is a method and system for implementing high fidelity blending for multichannel displays without requiring the use of a dedicated blending hardware for processing video information after it emerges from image generation. The present invention provides a system which can be efficiently implemented on multiple computer system platforms. The system of the present invention is inexpensive, and does not require additional, dedicated hardware for its implementation. The present invention and its benefits are further described below.

Figure 3:
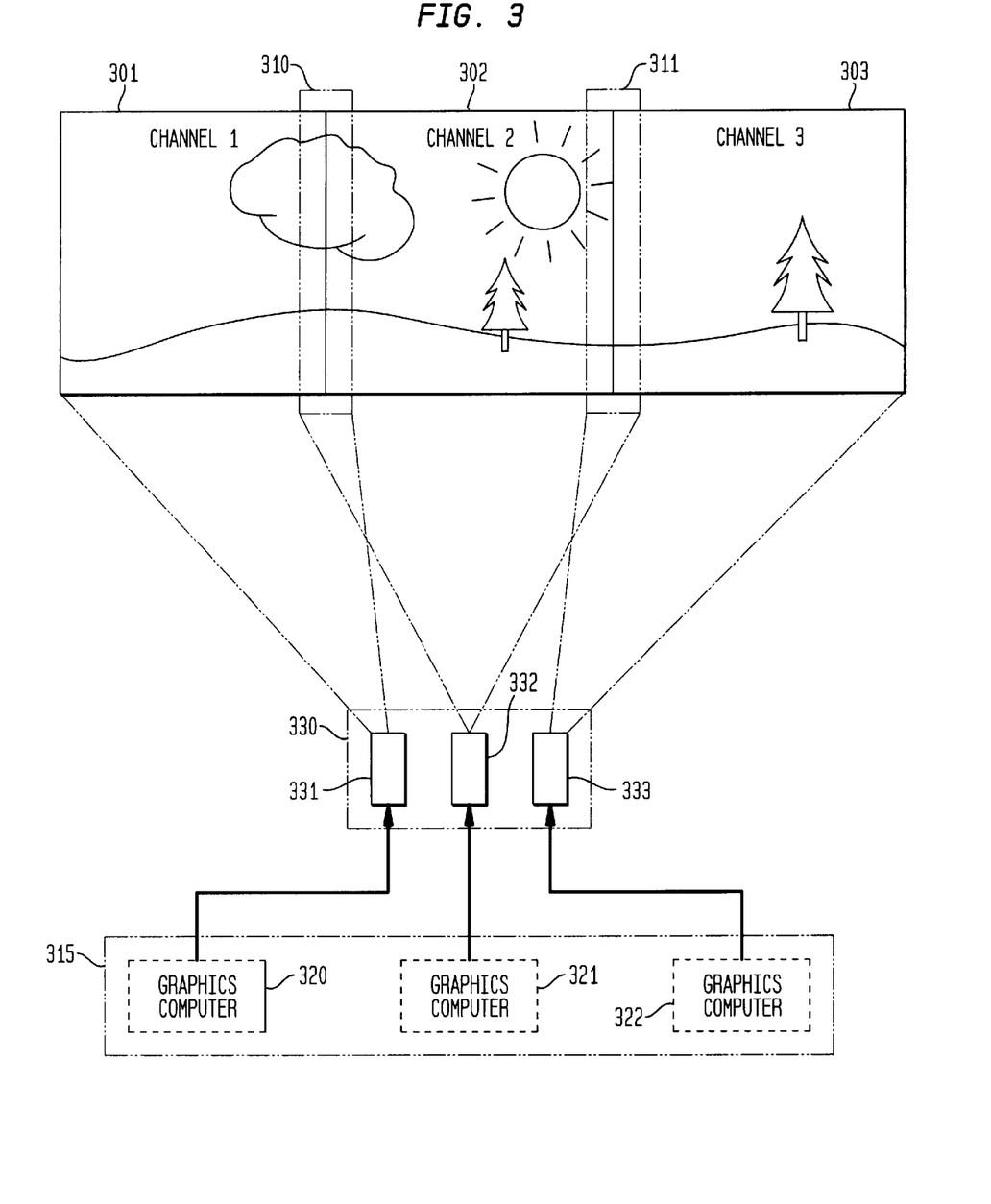

Referring now to FIG. 3, a multichannel display system 300 in accordance with one embodiment of the present invention is shown. In the present embodiment, system 300 includes three large projection-type screens 301–303 (e.g., 20 feet by 30 feet) which combine to form a single very large, high fidelity display (e.g., 20 feet by 90 feet). The large display is capable of presenting, seamless, high fidelity graphics which span the entire area of screens 301–303. Fidelity is implemented by achieving a seamless overlap of the images of each of the screens 301–303. In the present embodiment, the overlap occurs in a first and second overlap region, region 310 and region 311.

Within these overlap regions 310 and 311, the image from the each of the channels overlaps the image each adjacent channel by a predetermined amount. For example, the images of channel 1 overlaps the images of channel 2 in overlap region 310, and likewise for channel 2 and channel 3 in overlap region 311. The brightness levels of the images of the respective channels is precisely determined and controlled such that a seamless junction is created between the images. In accordance with the present invention, the process of determining an controlling the brightness levels is implemented within an image generator unit 330, as opposed to using a separate blending unit.

Image generator 330 includes three graphics computer systems (e.g., high performance graphics workstations) which generate the computer graphics information for each respective channel. The blending process of the present invention is implemented within the graphics subsystems of the graphics computers. The image information emerging from the graphics computers includes all the necessary blending required for overlap regions 310 and 311. Hence, no additional processing need be performed on the information emerging from the graphics computers 320–322.

The video information is coupled directly to image projectors 301–303, for projection onto screens 301–303. Since each video frame has been previously blended within the graphics pipelines of computer systems 320 322, the images of screens 301–303 will blend seamlessly within overlap regions 310 and 311.

Since the blending functionality of the present invention is implemented entirely within the computer systems 320–322, the system of the present invention is much more efficient than comparable prior art multichannel display systems. By performing the required blending entirely within image generator 330, the present invention eliminates the requirement for an external, dedicated blending unit as required in typical prior art systems. This makes system 300 less expensive less expensive than comparable prior art systems.

In addition, since the blending functionality of the present invention is implemented within the graphics pipelines of computer systems 320–322, the present invention is readily portable. System 300 implements high fidelity blending for multichannel displays without requiring the use of a dedicated blending hardware for processing video information after it emerges from image generation (e.g., emerges from graphics computers 320–322). Consequently, system 300 can be more easily and efficiently implemented on different types of computer system platforms.

Figure 4:
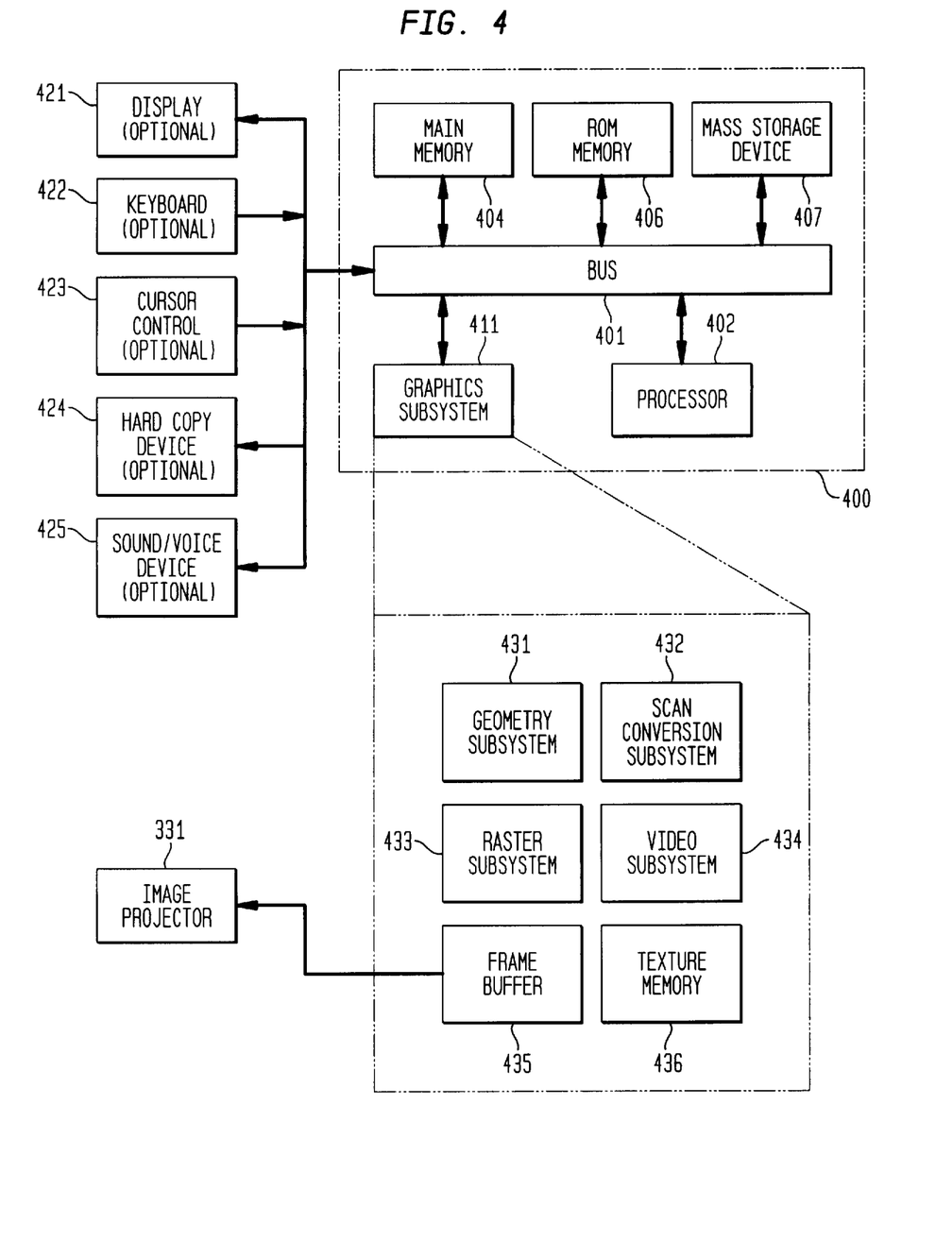
FIG. 4 shows a diagram of the typical components of a graphics computer included within an image generator used in a multichannel display system in accordance with one embodiment of present invention.

Referring now to FIG. 4, a diagram of a graphics computer system (e.g., graphics computer 321) in accordance with one embodiment of the present invention is shown. System 321 includes any computer graphics systems for generating complex or 3 dimensional images. Computer system 321 includes a bus 401 for transmitting digital information between the various parts of the computer system. One or more microprocessors 402 are coupled to bus 401 for processing information. The information along with the instructions of how the information is to be processed are stored in a hierarchical memory system comprised of mass storage device 407, read only memory 406, and main memory 404. Mass storage device 407 is used to store large amounts of digital data. The mass storage device 407 can consist one or more hard disk drives, floppy disk drives, optical disk drives, tape drives, CD ROM drives, or any number of other types of storage devices having media for storing data digitally. A read only memory (ROM) 406 is used to store digital data of a permanent basis, such as instructions for the microprocessors. Main memory 404 is used for storing digital data on an intermediate basis. Main memory 404 can be dynamic random access memory (DRAM).

A 3D graphics rendering system 411 is an option which can be included in system 321. Processor 402 provides the graphics system 411 with graphics data, such as drawing Commands, coordinate vertex data, and other data related to an object's geometric position, color, texture, shading, and other surface parameters. The object data is processed by graphics system 411 in the following four pipelined stages: geometry subsystem 431, scan conversion subsystem 432, raster subsystem 433, and a video subsystem 434. The geometry subsystem 431 converts the graphical data from processor 402 into a screen coordinate system. It is the function of the geometry subsystem 431 to perform the projection and transformation process to give depth to a displayed object. The resulting primitives (points, lines, polygons, polyhedra, and the like) supplied by the geometry subsystem 431 are then supplied to the scan conversion subsystem 432. It is the function of the scan conversion subsystem 432 to then generate pixel data (e.g., fragments, fragment parameters, color information, and the like) based on these primitives. The scan conversion subsystem 432 performs the interpolation functions to interpolate straight lines so that each intermediate value need not be individually and separately calculated by the geometry subsystem. Next, the pixel data is sent to the raster subsystem 433, whereupon Z-buffering, blending, texturing (using texture data stored in texture memory 436), and antialiasing functions are performed. The resulting pixel values are subsequently stored in frame buffer 435, and the Z values are stored in the Z buffer 410. The video subsystem 434 reads the frame buffer 435, gamma corrects the image information stored therein, and sends the image (in the correct format) to the monitor 421. The video information is also output from frame buffer 435 to projector 331 for projection onto screen 302.

Several other optional devices may also be coupled to system 321. For example, an alphanumeric keyboard 422 is used for inputting commands and other information to processor 402. Another type of user input device is cursor control device 423 (a mouse, trackball, joystick, and the like) used for positioning a movable cursor and selecting objects on a computer screen. Another device which may be coupled to bus 401 is a hard copy device 424 (e.g., a laser printer) for printing data or other information onto a tangible medium. Additionally, a sound recording or video option 425 can be coupled to the system 321 to provide multimedia capabilities.

Graphics computers 320 and 322 are each substantially similar to graphics computer 321. As with graphics computer 321, workstations 320 and 322 function by generating the image information required for projection onto their respective screens 301 and 303.

Figure 5:
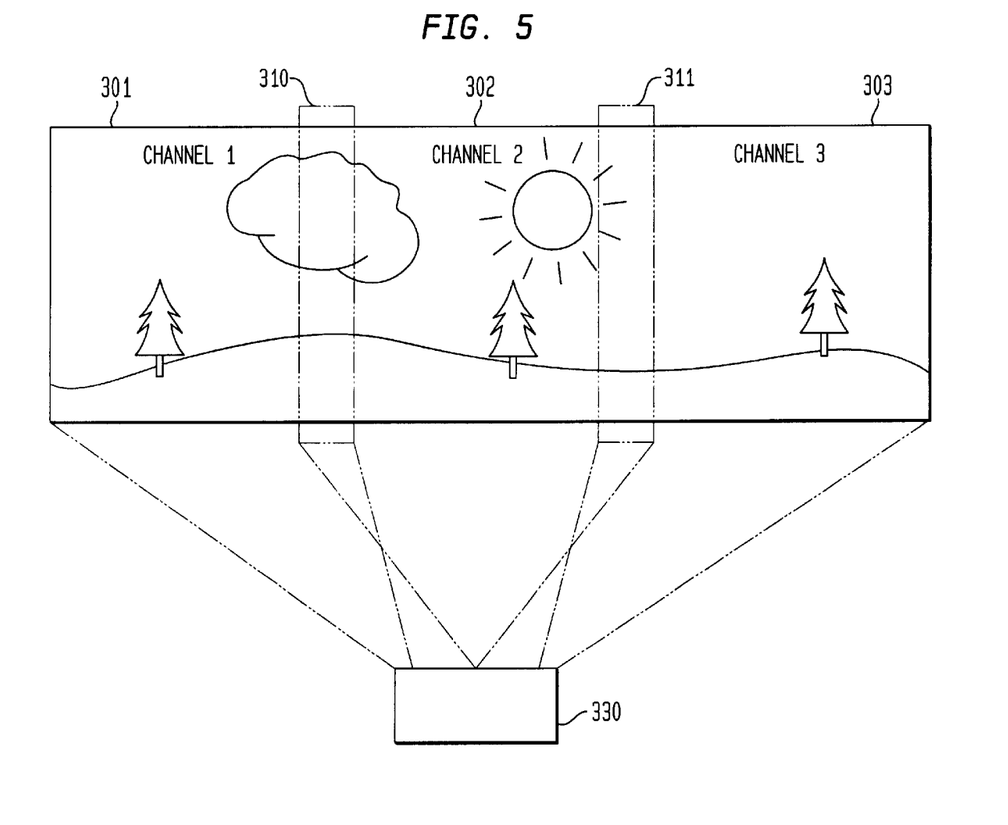
FIG. 5 shows a diagram of the relationship between the respective video channels of a multichannel display system in accordance with one embodiment of present invention.
Figure 6:
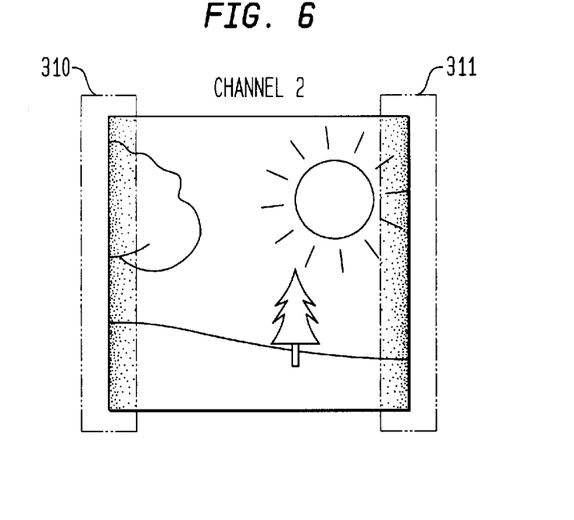
FIG. 6 shows a diagram of the overly regions of the center channel of the multichannel display system of FIG. 5.

With reference now to FIG. 5 and FIG. 6, diagrams of the image projected onto the center channel (channel 2 on screen 302) of the multichannel display are shown. FIG. 5 shows the location of channel 2 with respect to channels 1 and 3. FIG. 6 shows the image of channel 2 without any overlap from channels 1 and 3.

As described above, the brightness levels of each of the channels (e.g., channels 1–3) in their overlap regions is precisely controlled in order to make the junctions between them appear as unnoticeable as possible. In the case of channel 2, the center channel, the brightness of the image displayed decreases in the regions 310 and 311. This is so that when channel 2's image is overlapped on the images of channels 1 and 3, the seam between channels 1, 2, and 3 will not be noticeable. In prior art multichannel display systems, this blending was performed using a separate, discreet, blending processor or device. In accordance with the present invention, this blending is performed within the graphics subsystem as the image is being generated.

Figure 7:
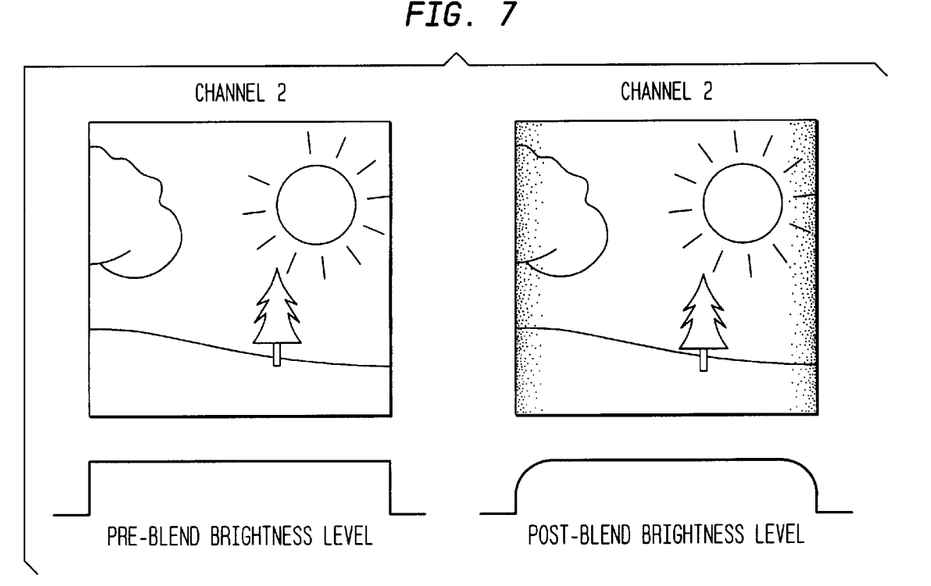
FIG. 7 shows a pre-blended depiction and a post-blended depiction of the image displayed via channel 2 in accordance with one embodiment of present invention.

FIG. 7 shows a pre-blended depiction and a post-blended depiction of the image displayed via channel 2. The pre-blended depiction is on the left side of FIG. 7 and the post-blended depiction is on the right side of FIG. 7. Beneath each depiction is a corresponding diagram of the brightness level of the pre-blended and post-blended images, where brightness level is shown in the vertical direction and the horizontal dimension of the respective image is shown in the horizontal direction.

As shown in FIG. 7, the brightness level of the pre-blended image is uniform across the horizontal dimensions of the image. However, after blending, the brightness level is decreased at the far left and far right edges of the image, the overlap regions 310 and 311. In a similar manner, the far right brightness level of the image from channel 1 decreases so that when the two channels are overlapped, the brightness level is uniform across both channels. Likewise, the far left brightness level of the image from channel 3 decreases so that when channels 2 and 3 are overlapped, the brightness level is uniform across them. In this manner, channels 1, 2, and 3 are blended to create the single large display, as the decreased brightness levels of the overlap regions 310 and 311 combine to obtain a nominal brightness level. The blending is determined by and derived from the geometry of the display system. The present invention is not limited to the simple geometry, but can support arbitrary blend shapes as determined by the particular requirements of the display design.

Figure 8:
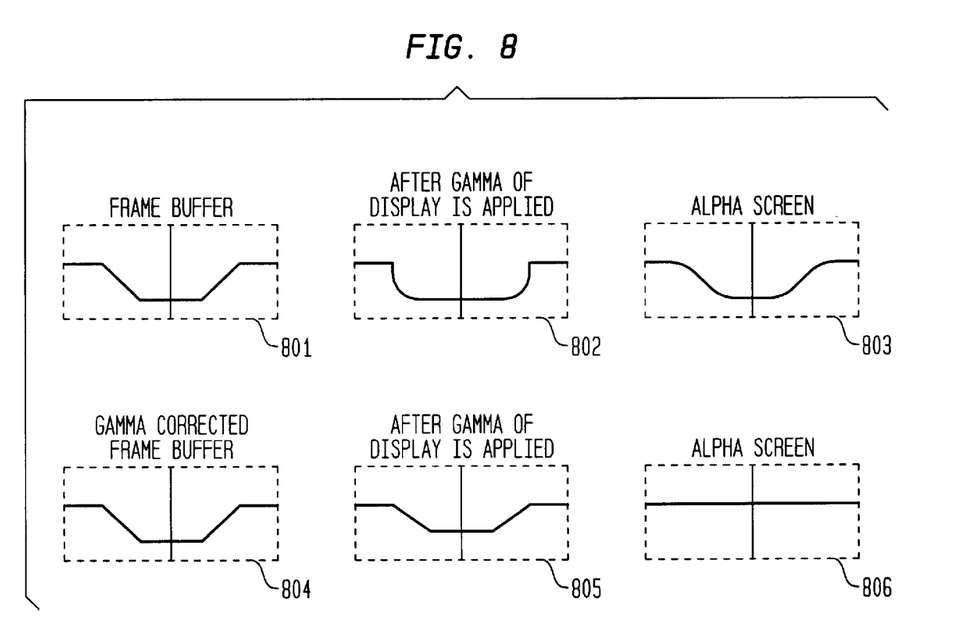
FIG. 8 depicts a series of diagrams representative of the brightness level of the image information within the frame buffer of one of the graphics computers in accordance with one embodiment of present invention.

FIG. 8 depicts a series of diagrams representative of the brightness level of the image information within the frame buffer of one of the graphics computers 320–322 (e.g., workstation 321). The left column of FIG. 8 shows two diagrams (diagram 801 and diagram 804) representing the brightness level of the contents of the frame buffer. The center column of FIG. 8 shows two diagrams (diagrams 802 and 805) of the gamma level of the screen (e.g., screen 302), and the right column shows two diagrams (diagrams 803 and 806) of the brightness level of the screen (e.g., display screen 302) as actually seen by a user. The three diagrams on the top row of FIG. 8 (diagrams 801–803) depicts a case where blending is improperly implemented. The three diagrams on the bottom row FIG. 8 (diagrams 804–806) depict a case where, in accordance with present invention, blending is properly implemented.

In accordance with the present embodiment, the blending is performed as the image information is being rendered into the frame buffer of the workstation (e.g., workstation 321). Diagram 801 and diagram 804 represent the brightness level of the post blended image stored within the frame buffer (e.g., frame buffer 435). To achieve uniform nominal brightness on display screen 302, it is important that the post blended image is processed to take into account the gamma level of the screen 302. The top row of FIG. 8 depicts a case where this is improperly implemented. For example, when the brightness level of the image (e.g., diagram 801) combines with the gamma level of the image projector 331 (e.g., diagram 802), a nonuniform brightness results (e.g., diagram 803) since the blending performed on the image rendered into the frame buffer 435 did not properly take into account the gamma level of the screen 302. This is for a situation where gamma correction is not supported in the video system 434 of the graphics subsystem 411.

The bottom row of FIG. 8 depicts a case where the blending is properly implemented. The image is rendered into frame buffer 435 in such a manner as to account for the gamma level of the screen 302. This yields a resulting image on screen 302 having uniform brightness across its area, as shown by diagram 806. The present invention is able to take into account the gamma characteristics of each of the projectors 330–332. In accordance with the present invention, the images are rendered into the frame buffer with their respective overlap regions blended in consideration of the gamma characteristics of the respective screens. Since the blending process of the present invention occurs as the images are being rendered, the present invention can be easily adjusted in light of the gamma characteristics of any particular screen.

Figure 9:
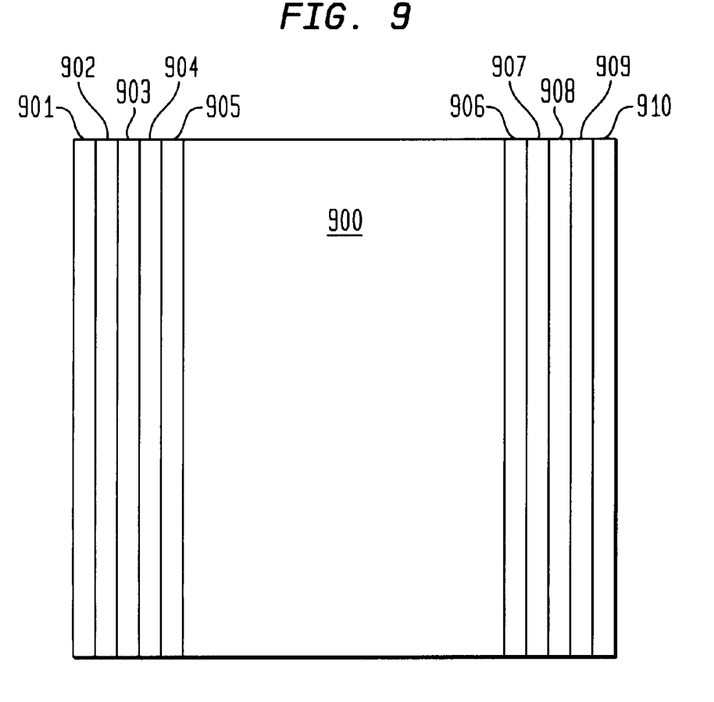
FIG. 9 shows a diagram depicting a multi-polygon rendering method for implementing the overly regions in accordance with one embodiment of present invention.

FIG. 9 shows one method in accordance with present invention for generating the blended overlap regions. In this method, the brightness control is achieved by using the graphics processing capabilities of the graphics subsystem (e.g., graphics subsystem 411) of the graphics computer (e.g., graphics computer 321). A set of polygons are drawn across the overlap regions of a rendered image (e.g., the image rendered into the frame buffer 435 that is to be processed and subsequently displayed on one of screens 301–302). Each of the polygons has a respective transparency value (e.g., alpha) and a color value. In this embodiment, the process of the present invention blends the image 900 by multiplying the image intensity by the intensity described by the color and/or transparency values of the polygons 901–905 and 906–910. This has the effect of decreasing the brightness level of the image 900 in the manner required to accomplish the seamless blend (e.g., the post blend brightness level shown in FIG. 7). The blend intensity of each of the polygons 901–910 can be described in the form of a texture applied to the polygons 901-910 or per vertex intensity values.

Figure 10:
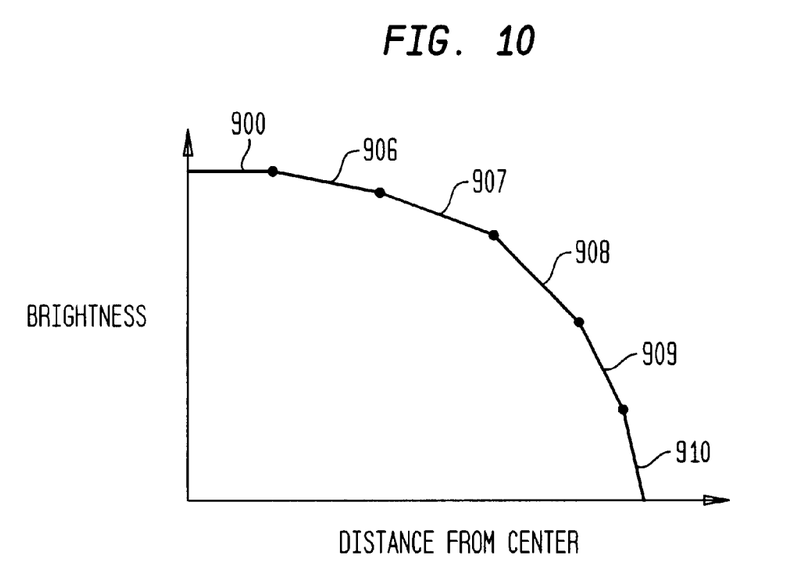
FIG. 10 shows a diagram depicting the effect on the brightness level of an image as the multiple polygons from FIG. 9 are blended into the image.

FIG. 10 shows a diagram depicting the effect on the brightness level of the image 900 as a color of the polygons 906–910 are blended in. As shown in FIG. 10, controlling brightness level by blending multiple polygons into the image results in a "piecewise linear" approximation of the desired smooth profile from the normal brightness level of the image 900 to the fully dark brightness level of the image, on the far right side of the overlap region, shown by polygon 910. The desired "brightness profile" of the overlap regions is controlled by adjusting the color/transparency of the multiple polygons, and by increasing or decreasing the number of polygons used to create the brightness profile.

Figure 11:
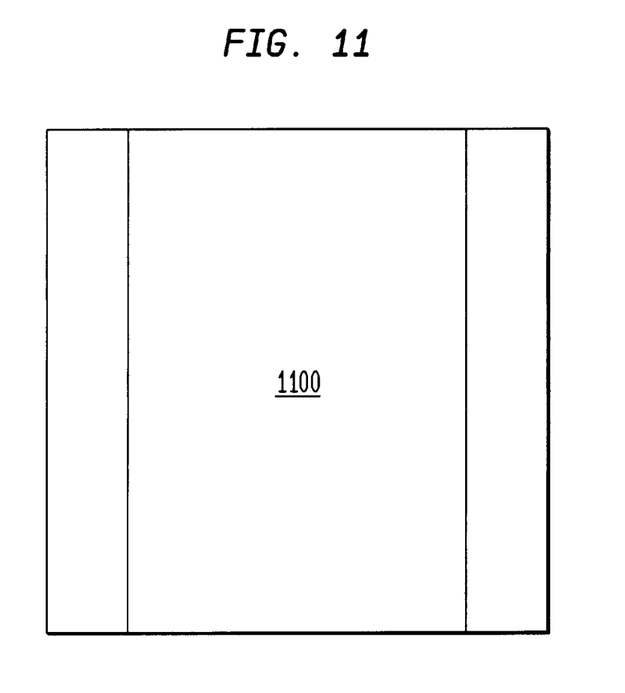
FIG. 11 shows a diagram of a one-dimensional texture rendering method for implementing the overly regions in accordance with one embodiment of the present invention.

FIG. 11 shows a second method in accordance with the present invention for generating the blended overlap regions using polygons. This method is different from the method shown in FIG. 9 in that instead of using many different polygons (e.g., polygons 901–905 and polygons 906–910) to create the overlap regions, a single polygon is used for each overlap region, polygon 1101 and polygon 1102. Polygons 1101 and 1102 both have a respective one-dimensional texture that is used to control their respective brightness. The one-dimensional texture includes a number of samples that describe the color/transparency of the texture. Hence, as the one-dimensional texture is mapped onto, for example, polygon 1102, the brightness of the underlying image 1100 decreases in accordance with the brightness profile described by the one-dimensional texture. This is depicted in FIG. 12 below.

Figure 12:
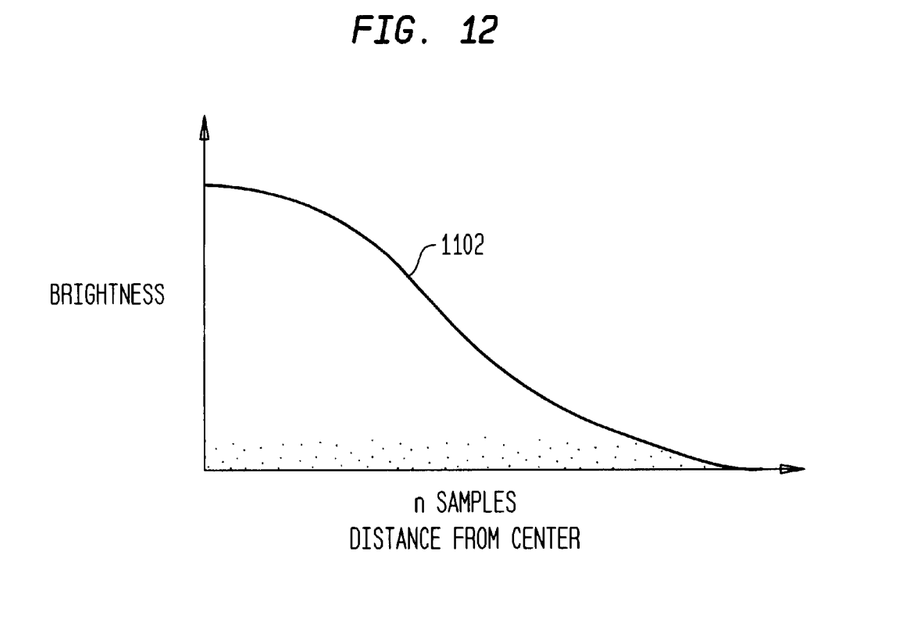
FIG. 12 shows a diagram depicting one possible brightness profile of an image resulting from the method depicted in FIG. 11.

FIG. 12 shows the brightness profile of the polygon 1102 as described by the samples, n, of the one-dimensional texture that is mapped onto polygon 1102. This brightness profile would be substantially similar to the brightness profile shown in FIG. 10, however, the brightness profile of FIG. 12 is more "continuous" since a larger number of samples are used to describe the profile and more complex shapes could be efficiently represented. This method tends to emphasize the use of the texture hardware of graphics subsystem 411 while the method of FIG. 9 tends to emphasize the use of the geometry and shading hardware of graphics subsystem 411.

Figure 13:
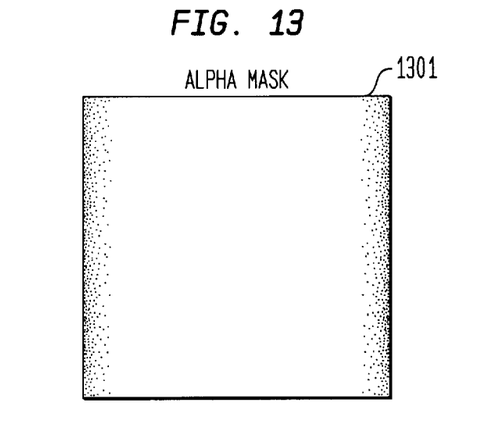
FIG. 13 shows a diagram depicting an alpha mask rendering method for implementing the overlap regions in accordance with one embodiment of present invention.

FIG. 13 shows a third method in accordance with present invention for generating the blended overlap regions by using an alpha mask. FIG. 13 depicts an alpha mask 1301 which is stored into the frame buffer 435 prior to the rendering of an image. Alpha mask 1301 includes a unique blend modulation value for each pixel in the frame buffer 435. These values are used to create the desired brightness profile for the image when the image is later rendered into the frame buffer 435. When the scene is later rendered, each pixel written to the frame buffer is multiplied by the alpha brightness already stored within the frame buffer 435. This results in an image with a correctly modulated brightness intensity, ready to be sent to projector 331.

One advantage of using alpha masks to implement the overlap regions is that the alpha mask readily allow control of the contour or outline of the boundaries of the overlap regions. For example, as opposed to implementing overlap regions having "regular" straight boundaries (e.g., as shown in FIG. 13) the alpha masks can be configured to implement irregularly shaped overlap regions having irregularly shaped boundaries. This helps to obscure the junction between the channels of the display system, reducing the degree to which the seam is noticeable.

Additionally, although the discussions of the present invention in FIGS. 3 through 13 show the invention functioning with 3 screens horizontally aligned, it should be appreciated that the blending process of the present invention can be applied to multichannel displays having any number of screens arrayed in any number of configuration (e.g., tiled, stacked, etc.).

Figure 14:
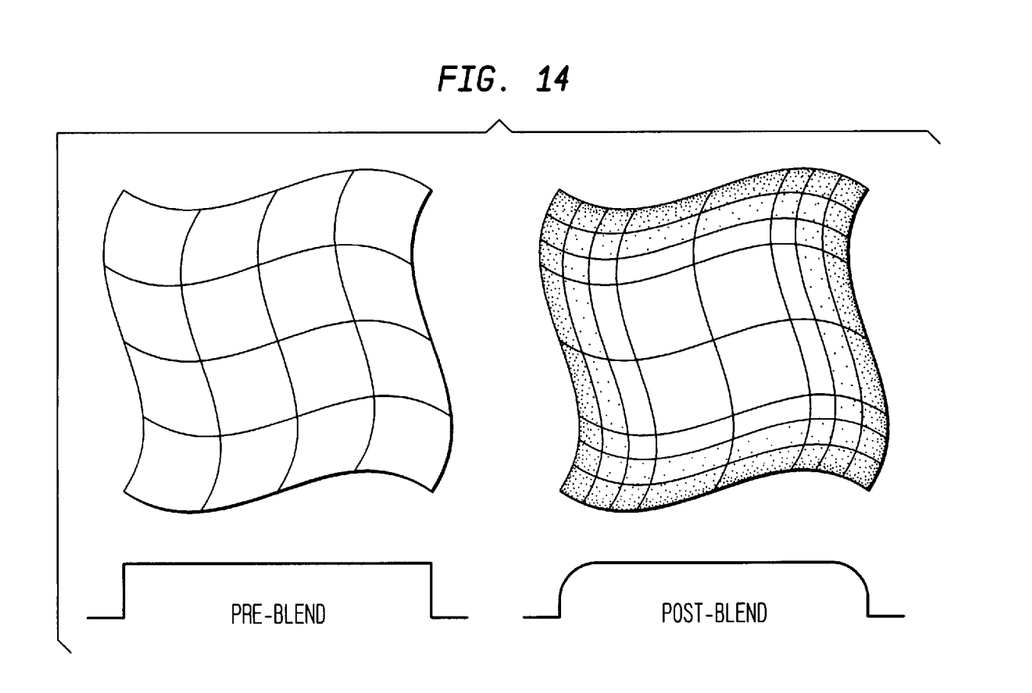
FIG. 14 shows a diagram depicting an image read back from texture memory method for implementing the overlap regions in accordance with one embodiment of present invention.

FIG. 14 shows a fourth method for generating the blended overlap regions in accordance with one embodiment of the present invention. In this method, all or parts of the image in the frame buffer 435 are copied back to texture memory 436 within graphics subsystem 411. This image information constitutes data which can be applied as a texture on to one or more polygons rendered into the frame buffer 435, where the underlying color of the polygon or polygons is used to modulated the color of the "texture" from texture memory 436 (where this texture comprises the image that was read from frame buffer 435 to texture memory 436). The left side of FIG. 14 shows an image mapped onto a polygon mesh prior to subdivision and its corresponding pre-blend brightness profile. The right side of FIG. 14 shows the image mapped onto the polygon mesh after the mesh has been subdivided in the overlap regions and its corresponding post-blend brightness profile. In this case, the overlap regions are on each edge of the image (e.g., top, bottom, left, and right).

In cases where there is no nonlinear image mapping, only those images which are undergoing a blend are read back from frame buffer 435 to texture memory 436. Polygons are subsequently rendered into the frame buffer over the regions the image was read from. These polygons can then be subdivided to further increase their discreetness across the overlap or blend regions. The suitably discrete polygons are then textured with the image information from texture memory 436. Depending upon their respective location within the blend regions, the polygons are assigned different colors such that when they are textured with the image information, the resulting image has its brightness level appropriately modulated within the overlap regions of the image. If the underlying image (e.g., image 1100) is suitably discrete across the overlap region, values of the n samples (e.g., blend luminance multipliers) may be specified at a per vertex level, resulting in the texture intensity being modulated on application to the frame buffer. Additionally, it should be noted that this method is similar to distortion correction solutions and other solutions where an image in texture memory is applied to an image stored within the frame buffer using a texturing operation, such as in, for example, video playback or texture read back, antialiasing, and the like.

In the prior art, techniques similar to the above are used for nonlinear image distortion correction, whereby an image rendered into the frame buffer is read back into texture memory and then subsequently texture mapped onto a polygon mesh rendered into the frame buffer. This polygon mesh has geometry characteristics which are designed to compensate for distortion caused by, for example, and irregularly shaped screen (e.g., a "wraparound" screen). Texture mapping the image onto this polygon mesh and then sending be resulting image to a projector for display corrects the distortion caused by the irregularly shaped screen. In accordance with the present invention, this technique is used to apply the blending for properly implementing overlap regions as required by a multichannel display.

Figure 15:
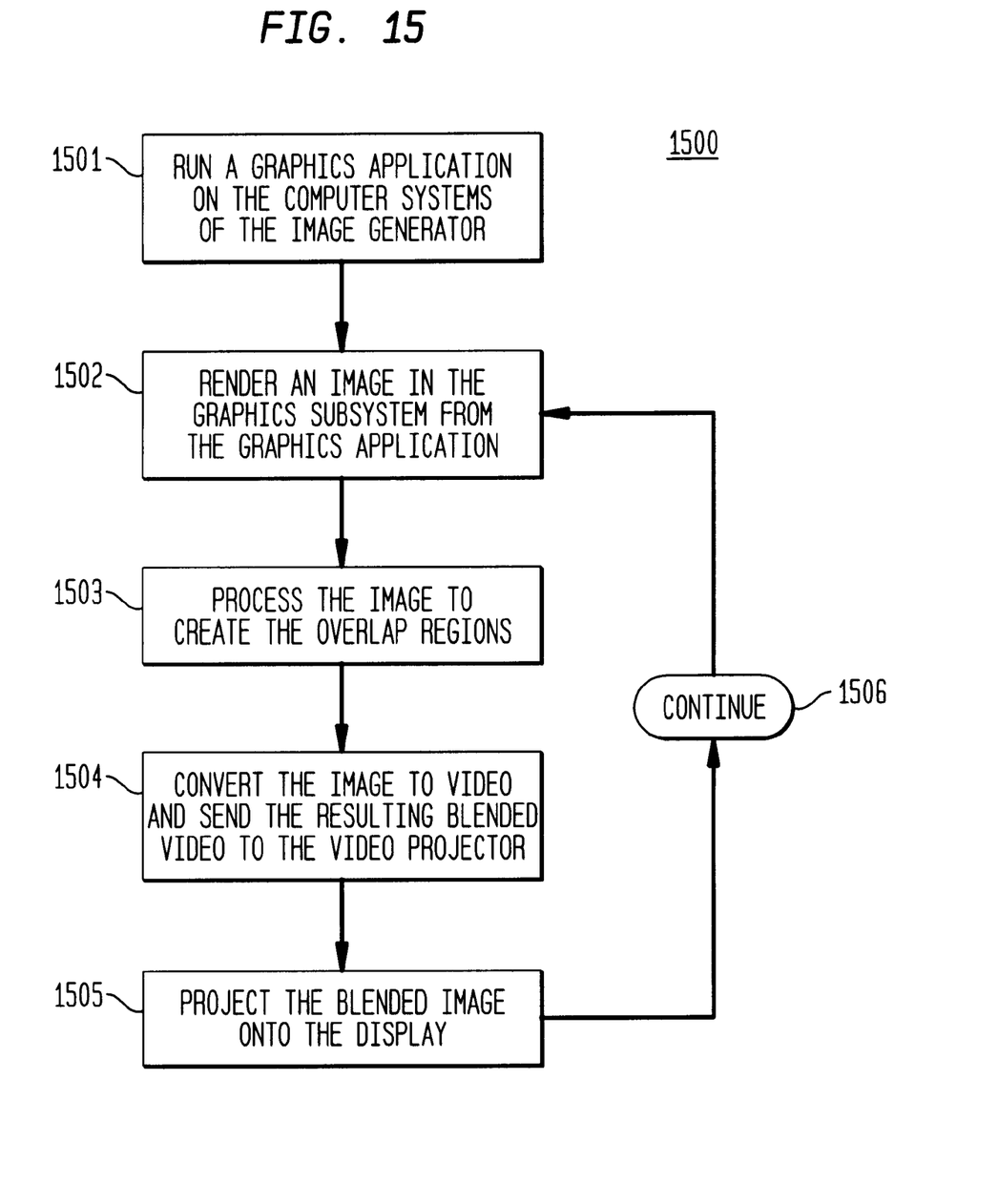
FIG. 15 shows a flow chart of the steps of a blending process in accordance with one embodiment of present invention.

With reference now to FIG. 15, a flow chart of the steps of a process 1500 in accordance with one embodiment of the present invention is shown. Process 1500 depicts the steps of a blending process used by system in accordance with present invention (e.g., system 300), where polygons are used to implement overlap regions, as the image information is being generated within an image generator (e.g., image generator 330).

Process 1500 begins in step 1501, where the graphics computers (e.g., graphics computers 320–322) within the image generator 330 execute graphics applications which generate the images for display. In step 1502, the graphics application executing on the processors of the workstations (e.g., graphics computer 321) renders an image into the frame buffer (e.g., frame buffer 435) of the graphics subsystem (e.g., graphics subsystem 411). In step 1503, the image stored in the frame buffer 435 is processed to create the necessary overlap regions (e.g., overlap regions 310–311). As described above in the discussion of FIGS. 9 through 12, polygons are rendered into the frame buffer "over" the image stored into frame buffer in order to create the desired brightness profile. As discussed in FIGS. 9 in 10, a series of polygons can be rendered over the image stored in the frame buffer, where each polygon has a different color/transparency value, in order to implement the desired brightness profile. Alternatively, as discussed in FIGS. 11 and 12, a one-dimensional texture having a plurality of color/transparency samples can be mapped onto a single polygon, and that single polygon be used to implement and overlap region on top of the image stored within the frame buffer.

With reference still to FIG. 15, in step 1504, the blended image in the frame buffer 435 is converted into video format and sent to a video projector (e.g., image projector 331). In step 1505, the blended image is then projected by image projector 321 onto the respective screen (e.g., screen 302). Process 1500 is performed by each of the graphics computers within image generator 330, resulting in a seamless blended multichannel display for viewing by the user. As shown by step 1506, this process continues as the graphics application continues to function.

Figure 16:
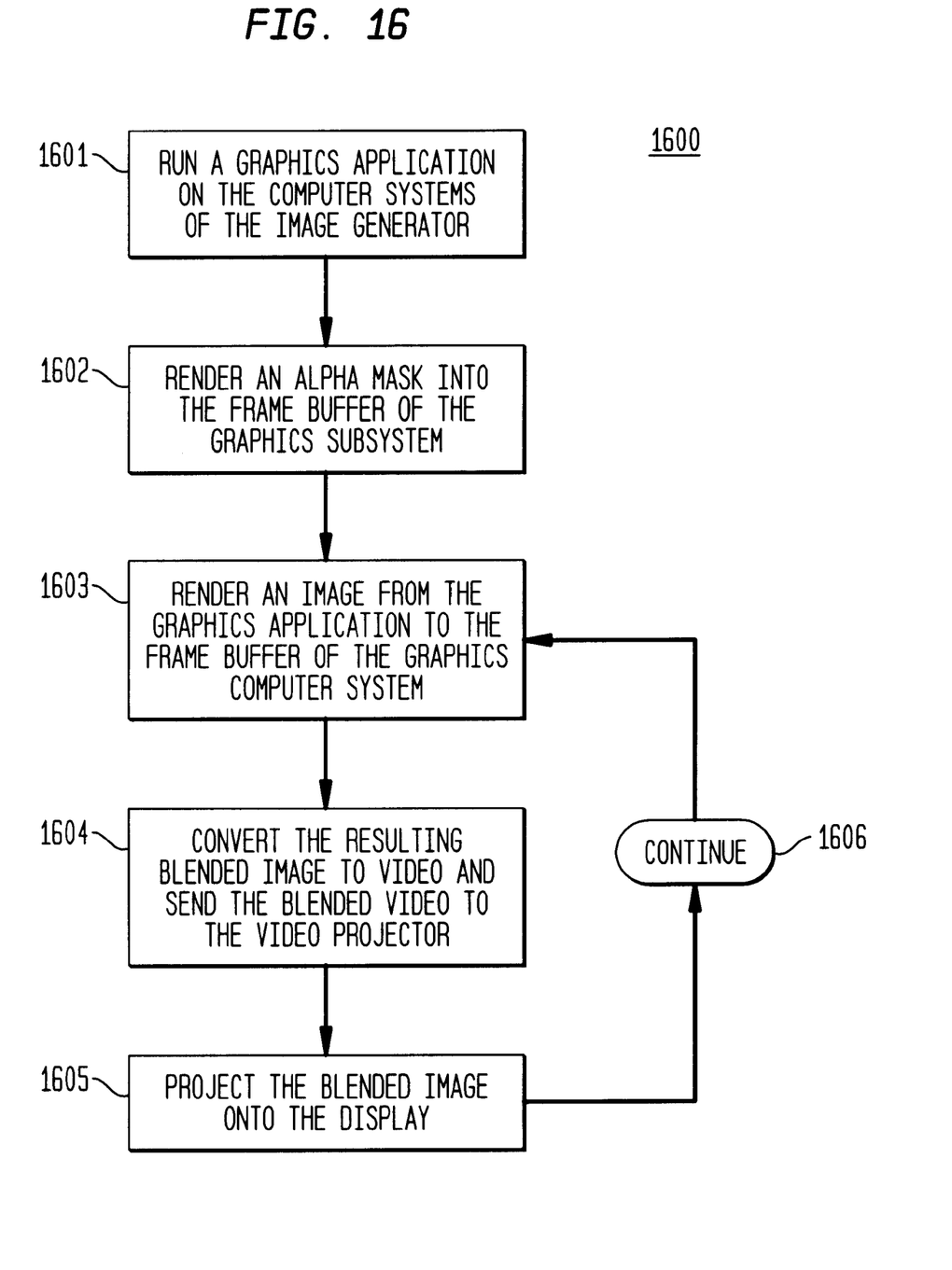
FIG. 16 shows a flow chart of the steps of an alternative blending process in accordance with one embodiment of present invention.

With reference now to FIG. 16, a flow chart of steps of a process 1600 in accordance with an alternate embodiment of the present invention is shown. Process 1600 is substantially similar to process 1500 of FIG. 15. However, and process 1600, as opposed to using polygons to implement the overlap regions 310–311, an alpha mask (e.g., alpha mask 1301 from FIG. 13) is used.

Process 1600 begins in step 1601, where a graphics application is executed. In step 1602, the graphics application sends image information to the graphics subsystem 411. In step 1602, as described in the discussion of FIG. 13, an alpha mask is rendered into the frame buffer 435 of the graphics subsystem 411. In step 1603, and image from the graphics application is then rendered into the frame buffer of the graphics subsystem, "on top of" the alpha mask. As described above, this process results in the image being blended within the overlap regions 310 as required. In step 1604, the resulting blended image is then converted to video format and sent to the image projector 331. In step 1605, the blended image is projected onto screen 302 by the image projector 331. As shown by step 1606, process 1600 continues as the graphics application continues to run, thereby implementing the seamless multichannel image for viewing by the user.

Thus, the present invention provides method for implementing edge blending between a multiple video channels to create a seamless multichannel display system. The present invention provides a method and system for implementing high fidelity blending for multichannel displays without requiring the use of a dedicated blending hardware for processing video information after it emerges from image generation. The present invention provides a system which can be efficiently implemented on multiple computer system platforms. Additionally, the system of the present invention is inexpensive, and does not require additional, dedicated hardware for its implementation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a multichannel display system, a method for implementing edge blending between a first and second video frame to create a seamless multichannel display system, comprising:
   a) rendering a first video frame for display on a first channel;
   b) rendering a second video frame for display on a second channel;
   c) rendering a first overlap region onto the first video frame to obtain a first blended video frame;
   d) rendering a second overlap region onto the second video frame to obtain a second blended video frame, wherein the first overlap region and the second overlap region are implemented by producing a first polygon to define the first overlap region and a second polygon to define the second overlap region, and mapping a first texture over the first polygon and a second texture over the second polygon such that the first and second textures modulate a brightness level within the first and second overlap regions; and
   e) combining the first blended video frame from the first channel and the second blended video frame from the second channel such that the first overlap region and the second overlap region correspond, thereby forming a seamless junction between the first blended video frame and the second blended video frame.

2. The method of claim 1, wherein the first video frame is rendered using a first computer system coupled to provide video information to the first channel, and the second video frame is rendered using a second computer system coupled to provide video information to the second channel.

3. The method of claim 1, wherein the first overlap region modulates a brightness level of the first video frame and the second overlap region modulate a brightness level of the second video frame such that the first blended video frame and the second blended video frame combine to form the seamless junction there between.

4. The method of claim 1, wherein the first polygon is a first plurality of polygons and the second polygon is a second plurality of polygons.

5. The method of claim 4, wherein the plurality of polygons have respective transparency values operable for modulating the brightness level within the first and second overlap regions.

6. The method of claim 4, wherein the plurality of polygons have respective color values operable for modulating the brightness level within the first and second overlap regions.

7. The method of claim 1, wherein the first and second textures include a plurality of colored samples operable for modulating the brightness level within the first and second overlap regions.

8. The method of claim 1, wherein a first transparency mask is stored within a first frame buffer and a second transparency mask is stored within a second frame buffer, the first and second transparency masks operable to modulate the brightness level within the first and second overlap regions as the first and second video frames are respectively rendered into the first and second frame buffers.

9. In a multichannel display system including at least a first computer system for generating video information for a first channel and a second computer system for generating video information for a second channel, a method for implementing edge blending between the first and second channels to create a seamless multichannel display, the method comprising the computer implemented steps of:
   a) using the first computer system, rendering a first video frame for display on the first channel;
   b) using the second computer system, rendering a second video frame for display on the second channel;
   c) rendering a first overlap region onto the first video frame to obtain a first blended video frame within a frame buffer of the first computer system;
   d) rendering a second overlap region onto the second video frame to obtain a second blended video frame within a frame buffer of the second computer system, wherein the first overlap region and the second overlap region are implemented by producing a first polygon to define the first overlap region and a second polygon to define the second overlap region, and mapping a first texture having a first color sample over the first polygon and a second texture having a second color sample over the second polygon such that the first and second textures modulate a brightness level within the first and second overlap regions;

e) projecting the first blended video frame from the first channel onto a first screen; and f) projecting the second blended video frame from the second channel onto a second screen, the first and second screens being directly adjacent, such that the first overlap region and the second overlap region correspond to form a seamless junction between the first blended video frame and the second blended video frame whereby the use of dedicated blending hardware external to one or more of the first computer system and the second computer system is not required.

10. The method of claim 9, wherein the first overlap region modulates a brightness level of the first video frame and the second overlap region modulates a brightness level of the second video frame such that the first blended video frame and the second blended video frame combine to form the seamless junction there between.

11. The method of claim 9, wherein the first polygon is a first plurality of polygons and the second polygon is a second plurality of polygons.

12. The method of claim 11, wherein the plurality of polygons have respective transparency values operable for modulating the brightness level within the first and second overlap regions.

13. The method of claim 11, wherein the plurality of polygons have respective color values operable for modulating the brightness level within the first and second overlap regions.

14. The method of claim 9, wherein the first colored sample is a first plurality of colored samples and the second colored sample is a second plurality of colored samples.

15. The method of claim 9, wherein a first transparency mask is stored within the frame buffer of the first computer system and a second transparency mask is stored within the frame buffer of the second computer system, the first and second transparency masks operable to modulate the brightness level within the first and second overlap regions as the first and second video frames are respectively rendered into the first and second frame buffers.

16. A multichannel display system, comprising:

a first computer system for generating video information coupled to a first channel; and a second computer system for generating video information coupled to a second channel, the first and second computer systems including respective processors coupled to respective memories, wherein the first and second computer systems execute software causing the first and second computer systems to implement a method for edge blending between the first and second channels to create a seamless multichannel display, the method comprising the computer implemented steps of:

a) using the first computer system, rendering a first frame for display on the first channel;

b) using the second computer system, rendering a second frame for display on the second channel;

c) rendering a first overlap region onto the first frame to obtain a first blended frame within a frame buffer of the first computer system;

d) rendering a second overlap region onto the second frame to obtain a second blended frame within a frame buffer of the second computer system, wherein the first overlap region and the second overlap region are implemented by producing a first polygon to define the first overlap region and a second polygon to define the second overlap region, and mapping a first texture having a first color sample over the first polygon and a second texture having a second color sample over the second polygon such that the first and second textures modulate a brightness level within the first and second overlap regions;

e) outputting the first blended frame from the first channel to a first projector for projection onto a first screen; and f) outputting the second blended frame from the second channel to a second projector for projection onto a second screen, the first and second screens being directly adjacent, such that the first overlap region and the second overlap region correspond to form a seamless junction between the first blended video frame and the second blended video frame whereby the use of dedicated blending hardware external to one or more of the first computer system and the second computer system is not required.

17. The system of claim 16, wherein the first overlap region modulates a brightness level of the first frame and the second overlap region modulates a brightness level of the second frame such that the first blended video frame and the second blended video frame combine to form the seamless junction there between.

18. The system of claim 16, wherein the first polygon is a first plurality of polygons and the second polygon is a second plurality of polygons.

19. The system of claim 18, wherein the plurality of polygons have respective transparency values operable for modulating the brightness level within the first and second overlap regions.

20. The system of claim 18, wherein the plurality of polygons have respective color values operable for modulating the brightness level within the first and second overlap regions.

21. The system of claim 16, wherein the first colored sample is a first plurality of colored samples and the second colored sample is a second plurality of colored samples.

22. The system of claim 16, wherein a first transparency mask is stored within the frame buffer of the first computer system and a second transparency mask is stored within the frame buffer of the second computer system, the first and second transparency masks operable to modulate the brightness level within the first and second overlap regions as the first and second frames are respectively rendered into the first and second frame buffers.

23. The system of claim 22, wherein the first and second transparency masks are configured to implement irregularly shaped first and second overlap regions, thereby rendering the junction between the first and second blended frames less noticeable.

24. The system of claim 16, wherein the first overlap region and the second overlap region are implemented by storing the first frame into a texture memory of the first computer system and the second frame into a texture memory of the second computer system, the first frame and the second frame subsequently texture mapped onto a first polygon mesh, including the first polygon, in the frame buffer of the first computer system and a second polygon mesh, including the second polygon, in the frame buffer of the second computer system.

25. The system of claim 24, wherein the first polygon mesh and the second polygon mesh include a plurality of polygons having a respective color such that the first overlap region and the second overlap region are implemented when the first frame and the second frame are texture mapped onto the first polygon mesh and the second polygon mesh.

26. The system of claim 24, wherein the first polygon mesh and the second polygon mesh are subdivided within the first overlap region and the second overlap region to implement the edge blending.

27. In a multichannel display system, a method for implementing edge blending between a first and second video frame to create a seamless multichannel display system, comprising:

storing a first transparency mask, having a first color sample, within a first frame buffer;

rendering a first video frame into the first frame buffer for display on a first channel, the first transparency mask operable to modulate the brightness level to implement a first overlap region;

storing a second transparency mask, having a second color sample, within a second frame buffer;

rendering a second video frame into the second frame buffer for display on a second channel, the second transparency mask operable to modulate the brightness level to implement a second overlap region; and projecting the first channel and the second channel such that the first overlap region and the second overlap region correspond, thereby forming a seamless junction between the first blended video frame and the second blended video frame.

28. The method of claim 27 further comprising:

implementing the first transparency mask using a first texture map; and implementing the second transparency mask using a second texture map.

29. The method of claim 28, wherein the first and second transparency masks are configured to implement irregularly shaped first and second overlap regions, thereby reducing visibility of a junction between the first and second channels.

30. The method of claim 29 further comprising:

rendering the first video frame into the first frame with the first transparency mask using a texture mapping unit of a graphics subsystem; and rendering the second video frame into the second frame with the second transparency mask using the texture mapping unit of the graphics subsystem.

31. In a multichannel display system, a method for implementing edge blending between a first and second video frame to create a seamless multichannel display system, comprising:

a) rendering a first video frame for display on a first channel;

b) rendering a second video frame for display on a second channel;

c) rendering a first overlap region onto the first video frame to obtain a first blended video frame;

d) rendering a second overlap region onto the second video frame to obtain a second blended video frame, wherein the first overlap region and the second overlap region are implemented by producing a first polygon to define the first overlap region and a second polygon to define the second overlap region, and mapping a first texture having a first color sample over the first polygon and a second texture having a second color sample over the second polygon such that the first and second textures modulate a brightness level within the first and second overlap regions; and e) combining the first blended video frame from the first channel and the second blended video frame from the second channel such that the first overlap region and the second overlap region correspond, thereby forming a seamless junction between the first blended video frame and the second blended video frame.

32. A multichannel display system, comprising:

a first computer system capable of rendering a first frame and a first overlap region onto the first frame to obtain a first blended frame within a first frame buffer for generating video information coupled to a first channel;

a second computer system capable of rendering a second frame and a second overlap region onto the second frame to obtain a second blended frame within a second frame buffer for generating video information coupled to a second channel for projection by a second projector onto a second screen;

a first projector capable of projecting the first blended frame onto a first screen; and a second projector capable of projecting the second blended frame onto a second screen;

wherein:

the first and second screens are directly adjacent, such that the first overlap region and the second overlap region correspond to form a seamless junction between the first blended video frame and the second blended video frame whereby the use of dedicated blending hardware external to one or more of the first computer system and the second computer system is not required; and the first overlap region and the second overlap region are implemented by producing a first polygon to define the first overlap region and a second polygon to define the second overlap region, and mapping a first texture having a first color sample over the first polygon and a second texture having a second color sample over the second polygon such that the first and second textures modulate a brightness level within the first and second overlap regions.

* * * * *